United States Patent Office 3,210,294
Patented Oct. 5, 1965

3,210,294
HYDROCARBON CRACKING CATALYST
Nicholas Chomitz, Yonkers, N.Y., and Leonard Anthony Cullo, Solon, Ohio, assignors to American Cyanamid Company, Stamford, Conn., a corporation of Maine
No Drawing. Filed Aug. 14, 1963, Ser. No. 301,954
6 Claims. (Cl. 252—453)

This invention relates to a process for preparing catalysts employed in hydrocarbon conversion processes and to the catalysts so prepared. This invention also relates to such hydrocarbon conversion processes employing the catalysts so prepared. In a more particular aspect, the present invention relates to a process for preparing silica alumina cracking catalysts.

The cracking of liquid petroleum hydrocarbons by passing the vapors of such hydrocarbons in contact with solid catalysts at relatively high temperatures, for example, from about 700° to about 1100° F., so as to obtain lighter liquid hydrocarbons and gases is well known. Frequently, deposits of coke are built up on the catalysts. Consequently, such catalysts are withdrawn, usually in a continuous manner and are contacted with steam at high temperature. Subsequently, coke on the catalyst surface is removed by burning and the regenerated catalyst is returned to the hydrocarbon conversion zone.

Synthetic silica alumina catalysts have long been employed commercially for the cracking of liquid hydrocarbons. However, such catalysts usually suffer from a deficiency since upon exposure to steam and high temperatures during regeneration their activity is frequently altered and is substantially diminished. This problem of loss of activity during steaming and thermal treatment has occasioned numerous modifications in processes for the production of such synthetic silica alumina catalysts whereby the loss of activity upon steaming or thermal treatment will be lessened.

Another problem previously faced by manufacturers of synthetic silica alumina catalysts has been that of reducing the amount of troublesome cations and anions in the finished catalysts. Since such silica alumina catalysts are prepared usually from alkali metal silicates and aluminates and aluminum salts of strong acids, the presence of contaminating ions in the finished catalysts has frequently exerted a deleterious influence upon such catalysts in a cracking unit.

Accordingly, it is an object of this invention to produce a synthetic silica alumina catalyst which possesses improved stability upon steaming and thermal treatment.

It is a further object of this invention to produce a synthetic silica alumina catalyst in which the amount of contaminating ions such as alkali metal ions and strong acid ions is substantially lessened.

In accordance with the present invention, it has been discovered that the foregoing objects and others may be readily realized by coating a previously prepared silica gel with an aluminate-alum coating by a process in which the aluminate is added prior to the addition of alum.

Previously known techniques for the preparation of synthetic silica alumina catalysts have employed the addition of alum to a previously prepared silica hydrogel followed by addition of ammonia or alkali metal aluminate at a pH of 4 to 5 to precipitate alumina onto the hydrogel. In accordance with the process of the present invention, it has been found that by reversing the order of addition of alum and aluminate, considerable savings may be realized in the amount of base normally employed during subsequent filtration and washing steps.

In carrying out the process for the production of synthetic silica alumina catalysts in accordance with the present invention, the addition of aluminate prior to the addition af alum takes place under carefully controlled pH conditions. Thus, a silica gel is prepared in a conventional manner by acidification of an alkali metal silicate solution, usually sodium silicate, to a pH of 3 to 9. This gel is then coated by adding an alkali metal aluminate solution, preferably containing about 20 to 30% $Al_2O_3$, to a slurry of the gel. The amount of alkali metal aluminate added is such so as to provide approximately 50% of the $Al_2O_3$, required in the finished catalyst and to bring the pH of the silica gel-aluminate slurry to about 11 to 12. Subsequently, aluminum sulfate is added to lower the pH of the silica gel-aluminate slurry to approximately 4 to 5. Thereupon precipitation of substantially all of the alumina not only from the alkali metal aluminate but also from the aluminum sulfate onto the gel takes place. The resultant slurry is then filtered, usually in stages, so as to effect purification by removal of substantially all of the soluble salts. The resultant silica alumina composite is then dried and calcined.

In general, the silica alumina catalyst containing from about 12 to about 25% $Al_2O_3$ by weight calculated on the total weight of $SiO_2$ and $Al_2O_3$ may be readily obtained by the process of this invention.

Temperature of the reaction mixture during the addition of alkali metal aluminate and aluminum sulfate and during the precipitation of the alumina may vary rather widely from about the freezing point of water to temperatures just below the boiling point of water. Good results are generally obtained within the range of 50° F. to 120° F.

Concentrations of the reactants employed are controlled so as to minimize the problems which may be encountered during the final filtration and washing steps. Usually, an alkali metal aluminate solution having an $Al_2O_3$ content of about 20% to about 30% is employed. An aluminum sulfate solution whose $Al_2O_3$ content is approximately 5% to 10% is ordinarily utilized.

The time for the addition of the alkali metal aluminate to the silica gel slurry may be varied from about five minutes to about an hour while the time for the addition of aluminum sulfate to the silica gel-aluminate slurry may be extended over a period ranging from five minutes to one hour, preferably one-half hour. Longer periods for the addition of either source of $Al_2O_3$ are not precluded, however.

Preparation of the silica gel base material is ordinarily accomplished by precipitating or flocculating a hydrated silica in a conventional manner. Thus, a solution of an alkali metal silicate, preferably at a concentration which will form a slurry containing about 5% $SiO_2$ after acidification, is placed in a vessel equipped with agitators. A suitable acid such as, e.g., sulfuric, hydrochloric, nitric or the like, is added over a period of time sufficient to precipitate silica. Acidification is preferably carried out by adding 25% sulfuric acid in a continuous stream to bring the final pH of the slurry to about 3 to about 9. Following the precipitation of the silica gel, alumina is deposited or coated thereon from alkali metal aluminate and alum in the manner described hereinabove. Following the deposition or coating of alumina and removal of the alkali metal ions and anions by washing, the resulting silica alumina composite is usually spray dried and calcined at about 1100° F. to form the finished catalyst.

In order to illustrate the features of the present invention, the following example is given.

EXAMPLE 1

Fifteen pounds of 41° Baumé sodium silicate containing 8.5% $Na_2O$ and 28.5% $SiO_2$ are diluted with 80 pounds of pure water. Eight and one-half pounds of 25% sulfuric acid are added with vigorous agitation during twenty minutes to the vessel containing the silicate solution maintained at 110° F. to cause gelation of silica.

To this slurry are added 2.2 pounds of 25% sulfuric acid in order to bring the pH of the slurry to approximately 8.0. The slurry is then aged at about 110° F. for twenty minutes. Thereafter, 3.23 pounds of sodium aluminate containing 29% $Al_2O_3$ are added to raise the pH to 11.5. Subsequently, 6 pounds of aluminum sulfate containing 7.5% $Al_2O_3$ are admixed with the slurry to lower the pH thereof to about 4.5 and to precipitate substantially all of the alumina. The silica-alumina slurry is then held for aging purposes for a period of one hour and is then filtered and washed. A slurry of 5 to 7% solids of silica-alumina is spray dried and the resultant microspheres are then calcined at 1100° F.

For the purpose of demonstrating the advantages of the process of the present invention, a silica-alumina catalyst is prepared by several alternative procedures. Such procedures are described in the following examples.

EXAMPLE 2

Fifteen pounds of 41° Baumé sodium silicate containing 8.5% $Na_2O$ and 28.5% $SiO_2$ are diluted with 80 pounds of pure water. Eight and one-half pounds of 25% sulfuric acid are added with vigorous agitation during twenty minutes to the vessel containing the silicate solution maintained at 110° F. to cause gelation of silica. To this slurry are added 2.2 pounds of 25% sulfuric acid in order to bring the pH of the slurry to approximately 8.0. The slurry is then aged at about 110° F. for twenty minutes. Subsequently, 3.23 pounds of sodium aluminate solution containing 29% $Al_2O_3$ and 6 pounds of aluminum sulfate solution containing 7.5% $Al_2O_3$ are simultaneously admixed with the slurry while holding the pH thereof at 8.2 to 8.5. Sulfuric acid (25%) is added to lower the pH of the slurry to 4.5 and to precipitate substantially all of the alumina. The silica-alumina slurry is then held for aging purposes for a period of one hour and is then filtered and washed. A slurry of 5 to 7% solids of silica-alumina is spray dried and the microspheres are then calcined at 1100° F.

EXAMPLE 3

Fifteen pounds of 41° Baumé sodium silicate containing 8.5% $Na_2O$ and 28.5% $SiO_2$ are diluted with 80 pounds of pure water. Eight and one-half pounds of 25% sulfuric acid are added with vigorous agitation during twenty minutes to the vessel containing the silicate solution which is maintained at 110° F. to cause gelation of silica. To this slurry sulfuric acid is then added in order to bring the pH thereof to approximately 3.0. Subsequently, 3.23 pounds of sodium aluminate containing 29% $Al_2O_3$ and 6 pounds of aluminum sulfate solution containing 7.5% $Al_2O_3$ are simultaneously added to and are admixed with the silica gel slurry while holding the pH at 4.5. Thereupon, substantially all of the alumina is precipitated onto the gel. The silica-alumina slurry is then held for aging purposes for a period of one hour and is then filtered and washed. A slurry of 5 to 7% solids of silica-alumina is spray dried and the resultant microspheres are then calcined at 1100° F.

EXAMPLE 4

Fifteen pounds of 41° Baumé sodium silicate containing 8.5% $Na_2O$ and 28.5% $SiO_2$ are diluted with 80 pounds of pure water. Eight and one-half pounds of 25% sulfuric acid are added with vigorous agitation during twenty minutes to the vessel containing the silicate solution which is maintained at 110° F. To this slurry are added 2.2 pounds of 25% sulfuric acid in order to bring pH of the slurry to approximately 8.0. The slurry is then aged at about 110° F. for twenty minutes. Subsequently, 6 pounds of aluminum sulfate solution containing 7.5% $Al_2O_3$ are added to the slurry whereupon the pH of the slurry becomes approximately 3.0 to 3.2. To gel-aluminum sulfate slurry are added 3.23 pounds of sodium aluminate containing 29% $Al_2O_3$ while adjusting the pH to 4.5. Thereupon, substantially all of the alumina is precipitated onto the gel. The silica-alumina slurry is then held for a period of one hour and is then filtered and washed. A slurry of 5 to 7% solids of silica-alumina is spray dried and the resultant microspheres are then calcined at 1100° F.

The catalysts prepared by the method described in each of the foregoing examples are tested and compared for change of surface properties and activity on steaming. Surface properties and activity are determined in accordance with the procedures described in the "Cyanamid Manual of Test Methods for Synthetic Fluid Cracking Catalyst," prepared by the Refinery Chemicals Department of American Cyanamid Company, copyright 1957.

The results of this comparison are set forth in the accompanying table.

Table

| | Catalyst of— | | | |
|---|---|---|---|---|
| | Example 1 | Example 2 | Example 3 | Example 4 |
| Activity, fresh | 101 | 65 | 142 | 120 |
| Activity, steamed | 38 | 26 | 25 | 29 |
| Gas, fresh | 1.22 | 1.58 | 1.03 | 1.07 |
| Gas, steamed | 1.03 | 1.11 | 1.07 | 0.98 |
| Apparent Bulk Density (g./cc.) | 0.48 | 0.30 | 0.42 | |
| Surface Area, fresh (m.²/g.) | 406 | 429 | | 488 |
| Surface Area, steamed (m.²/g.) | 161 | 152 | 154 | 184 |
| Pore Volume, fresh (cc./g.) | 0.66 | 0.81 | | 1.04 |
| Pore Volume, steamed (cc./g.) | 0.47 | 0.61 | 0.59 | 0.81 |
| Activity, steamed/Surface Area, steamed | 0.23 | 0.17 | 0.16 | 0.16 |

From the data appearing in the table, it will be noted that the activity on steaming of the catalyst of Example 1 is considerably higher than that of the catalyst of Examples 2, 3, and 4. Moreover, the ratio of activity, steamed to surface area, steamed demonstrates the increased hydrothermal stability of the catalyst of Example 1 as contrasted with that of the catalyst of Examples 2, 3 and 4. The foregoing results further indicate that the loss in activity on steaming is significantly less for a silica-alumina catalyst prepared by the process of this invention, i.e., by adding an alkali metal aluminate and subsequently adding aluminum sulfate to a prepared silica gel (Example 1), than that for a similar catalyst prepared by adding an alkali metal aluminate simultaneously with aluminum sulfate to a prepared silica gel (Examples 2 and 3) or by adding aluminum sulfate and subsequently adding an alkali metal aluminate to a prepared silica gel (Example 4).

While this invention has been described in conjunction with various preferred embodiments, it is to be understood that the invention is not to be solely limited thereto but is to be construed broadly and restricted only by the appended claims.

We claim:

1. A process for preparing a silica alumina cracking catalyst which comprises adding an alkali metal aluminate to a silica gel slurry until the pH thereof is approximately 11 to 12, subsequently adding an aluminum sulfate to the aluminate-silica gel slurry until the pH thereof is approximately 4 to 5 whereby a silica alumina precipitate is obtained, recovering said precipitate, drying and calcining the same.

2. A process as in claim 1 in which the amount of alkali aluminate and aluminum sulfate added is such so as to provide a silica alumina cracking catalyst having from about 12 to about 25% $Al_2O_3$.

3. A process as in claim 2 in which said silica gel slurry is obtained by acidifying an alkali metal silicate solution.

4. A petroleum hydrocarbon cracking catalyst having a high degree of activity stability, said catalyst being prepared by a process comprising adding an alkali metal aluminate to a silica gel slurry until the pH thereof is approximately 11 to 12, subsequently adding an aluminate to the aluminate-silica gel slurry until the pH thereof is approximately 4 to 5 whereby a silica alumina precipitate is obtained, recovering said precipitate, drying and calcining the same.

5. A petroleum hydrocarbon cracking catalyst having a high degree of activity stability, said catalyst being prepared by a process comprising adding an alkali metal aluminate to a silica gel slurry until the pH thereof is approximately 11 to 12, subsequently adding an aluminum sulfate to the aluminate-silica gel slurry until the pH thereof is approximately 4 to 5 whereby a silica alumina precipitate is obtained, said alkali aluminate and said aluminum sulfate each being employed in an amount sufficient to provide a silica alumina cracking catalyst having from about 12 to about 25 percent $Al_2O_3$, recovering said precipitate, drying and calcining the same.

6. A petroleum hydrocarbon cracking catalyst having a high degree of activity stability, said catalyst being prepared by a process comprising adding an alkali metal aluminate to a silica gel slurry until the pH thereof is approximately 11 to 12, preparing an aluminate-silica gel slurry by acidifying an alkali metal silicate solution, subsequently adding an aluminum sulfate to the aluminate-silica gel slurry until the pH thereof is approximately 4 to 5 whereby silica alumina precipitate is obtained, said alkali aluminate and said aluminum sulfate each being employed in an amount sufficient to provide a silica alumina cracking catalyst having from about 12 to about 25 percent $Al_2O_3$, recovering said precipitate, drying and calcinating the same.

References Cited by the Examiner
UNITED STATES PATENTS 2,933,456   4/60   Braithwaite _____ 212—455

PAUL M. COUGHLAN, *Primary Examiner.*

ALPHONSO D. SULLIVAN, DELBERT E. GANTZ,
*Examiners.*